March 29, 1966     E. CHAPMAN     3,243,819
PHOTOELASTIC STRESS ANALYSIS
Filed May 14, 1964
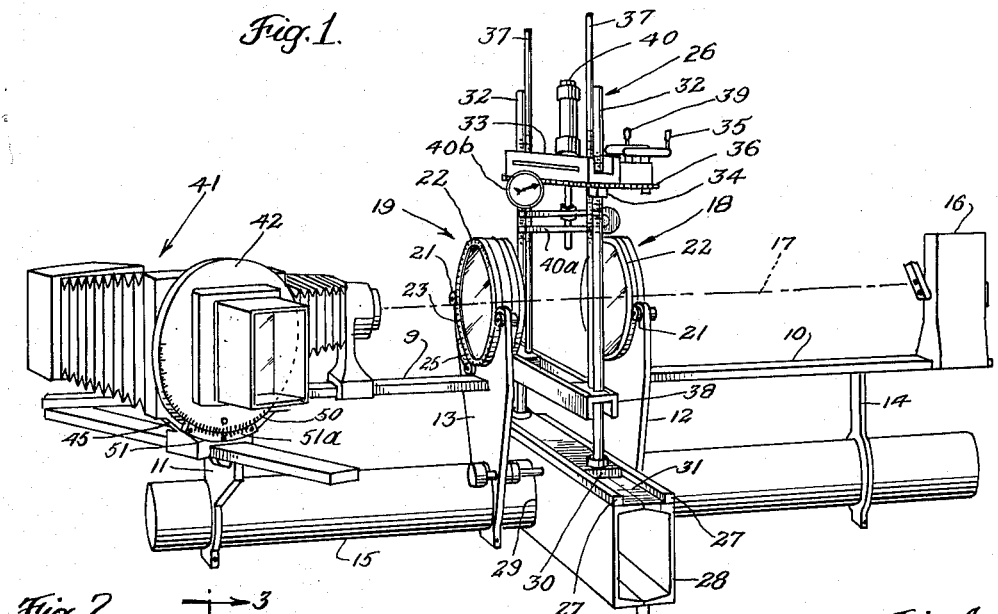
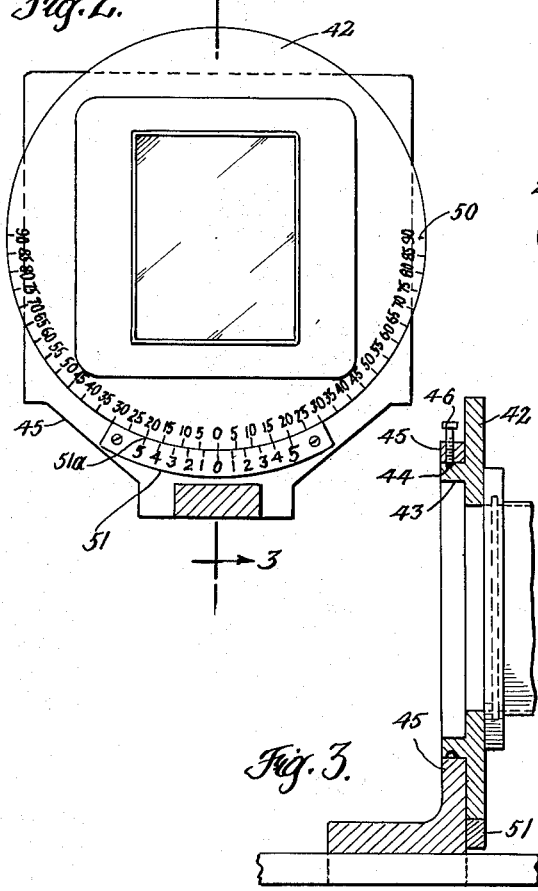
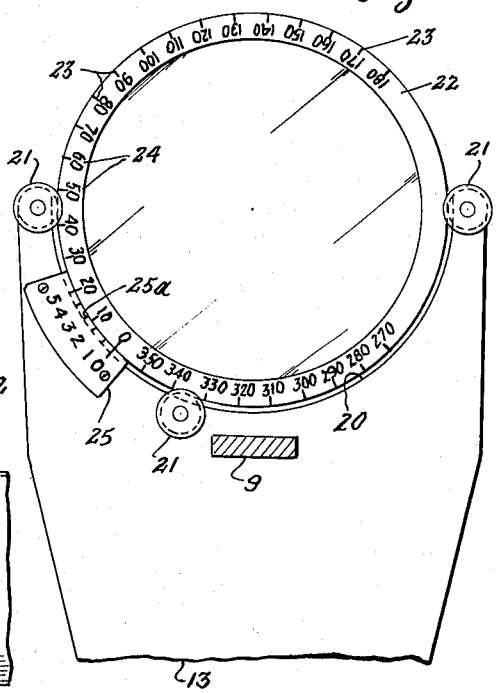
INVENTOR
EVERETT CHAPMAN
BY
Synnestvedt & Lechner
ATTORNEYS

United States Patent Office 3,243,819
Patented Mar. 29, 1966

3,243,819
PHOTOELASTIC STRESS ANALYSIS
Everett Chapman, P.O. Box 207, West Chester, Pa.
Filed May 14, 1964, Ser. No. 367,449
7 Claims. (Cl. 346—1)

This invention relates to the analysis of stress in structural members and more particularly, it relates to a method and apparatus for graphically analyzing the directions which the principal stresses taken in a model of the structural member under study.

The invention utilizes the principle that when a load is applied to an isotropic material such as glass, celluloid or certain other materials, it becomes birefringent or double-refracting in the stressed areas so that the light passing through the area is caused to vibrate in mutually perpendicular planes.

When a model or test specimen having the above properties is placed between polarizer and analyzer units of conventional photoelastic equipment and is subjected to a beam of monochromatic light with the quarter wave plates removed, an image is produced which has a plurality of dark areas or patches. These patches indicate the locus of all stresses parallel to the plane of polarization. The patches occupy different positions as the plane of polarization is changed. The images, called isoclinics, may be projected on a screen or paper and traced, or, in accordance with preferred operating technique, they may be photographed. Successive changes of the plane of polarization by rotating the polarizer and analyzer discs, shifts the dark areas to new positions which are the locus of new orientations of principal stresses. From a series of tracings or photographs of the areas, taken every few degrees of rotation of the polarizer and analyzer units, a composite picture may be formed giving the direction of the principal stresses over the entire specimen.

In order to construct this composite, the particular isoclinic is marked with a plurality of spaced apart vectors drawn parallel and/or perpendicular to the plane of polarization. If the composite is formed of a series of photographs, the vectors for each isoclinic must be aligned with the plane of polarization at which the vectors for successive isoclinics are connected to illustrate lines of principal stress. Care must be taken to lay out the vectors parallel to the successively changed plane of polarization and to properly align the vectored isoclinics when the stress map is constructed. This has proved to be a tedious and time-consuming process, particularly when a large number of photographs are taken or several specimens are to be analyzed.

Accordingly, the principal object of the invention is to provide improved and simplified photoelastic methods and equipment for constructing stress trajectory diagrams.

The invention will be described below in connection with the following drawings wherein:

FIGURE 1 is a perspective view of a photoelastic machine formed in accordance with the present invention.

FIGURE 2 is an elevational view of the camera back shown in FIGURE 1;

FIGURE 3 is a section taken along lines 3—3 of FIGURE 2; and

FIGURE 4 is a view of the analyzer assembly taken along the optical axis.

The general arrangement of the apparatus is shown most clearly in FIGURE 1. Horizontal support bars 9 and 10 are held in upright position by vertical supports 11–14 mounted on a one-piece alignment tube 15. A lamp housing 16 is mounted adjacent one end of the horizontal support bar 10. The housing contains a lamp and an appropriate filter to provide a source of monochromatic light which may be projected along an optical axis shown in dot-dash lines at 17. Polarizer and analyzer units, generally indicated at 18 and 19, are mounted for conjoint rotation in upright support plates 12 and 13 respectively. The structure for accomplishing this conjoint rotation is fully described in my copending application Serial No. 184,827, filed April 3, 1963, and therefore need not be described in detail here. Briefly, however, each of the plates 13 and 14 is provided with a circular cut-out, one such cut-out being shown at 20 in FIGURE 4. The discs are provided with ring-like frames 22 which ride in rollers 21 mounted on the support plates 12 and 13. The rotatably mounted polarizer and analyzer assemblies are interconnected by means such as are described in my copending application referred to above, so that they can be optionally rotated separately or as a unit. In operation, the quarter wave plates usually associated with this apparatus are removed and the polarizer and analyzer discs are set with their polarizing axes at right angles to one another. The assemblies are then rotated as a unit to change the plane of polarization of the light beam.

In order to determine the angular location of the plane of polarization, a series of uniformly spaced graduations 23 are inscribed on the analyzer ring 22. Suitable indicia 24 are also provided. The vernier 25 is mounted on the support plate 13 and has graduations 25a for cooperation with the graduations 23. When the zero graduations are aligned (as shown) the plane of polarization is in a fixed and known angular position, for example, extending vertically.

In order to support the model or test specimen undergoing analysis, a test specimen support frame 26 is spaced intermediate the polarizer and analyzer assembly. The frame is completely described in the copending application referred to above and reference is made thereto for details of its construction.

Briefly, the frame is mounted for sliding movement in machined guides 27 located on the upper surface of a rectangular box-like structure 28. The box-like structure 28 is provided with a hole 29 through which the alignment tube 15 passes. The tube and the box-like frame support 28 may be secured together as by welding or other suitable means. The guides 27 are long enough so that the support frame may be moved laterally out of the optical axis so that the operator can mount the test specimen without interfering with the optical elements of the equipment.

The frame is composed of a slidable base member 30 which is mounted for sliding movement on the surface 31 between the guides 27. Threaded upright supports 32 are mounted adjacent the ends of the base member 30. A cross-head 33 rests on nuts 34 which are in turn threadedly mounted on each of the threaded supports 32. A hand wheel 35 turns nuts 34 in unison through a chain drive 36, causing the nuts and thence cross-head 33 to travel up and down with respect to uprights 32. A second set of threaded uprights 37 are mounted for cooperation with threaded openings in upper cross-head 33. These uprights 37 carry a lower cross head 38 at their lower ends. The lower cross-head is also mounted for sliding movement on the uprights 32. A second hand wheel 39 rotates a pair of threaded members carried by the upper cross-head to raise and lower the supports 37. Thus, the two cross-heads may be moved vertically as a unit or may be adjusted with respect to each other in order to mount and properly orient a test specimen.

The support frame is also provided with a pressure cylinder 40, constant stress spring 40a and pressure indicator 40b for applying stress to the specimen. These elements are as described in the aforesaid copending application and reference is made thereto for a fuller explanation of their operation.

In a preferred embodiment of the invention, the image receiving means is in the form of a camera 41 located along the optical axis to receive images formed when the polarized light beam passes through the test specimen. The camera 41 is provided with a film support 42 which is mounted for rotation with respect to the camera frame as is best shown in section in FIGURE 3. In one form of my invention, the film support 42 is provided with an internal flange 43, which is adapted for rotation within the frame 45 of the camera 41. An annular groove 44 is machined in the flange 43. Set screw 46 in the frame 45 cooperates with the annular groove 44 to retain the film support within the frame and in set angular position. The film support 42 is adapted to hold conventional image recording media such as photographic plates or rolls. I prefer to use roll film and for this purpose, I mount conventional roll film and its holder (not shown) on the support. This roll film is conveniently of a type having 8 or 12 frames. As will appear subsequently, this arrangement is most convenient for photographically documenting a series of isoclinics.

The film support 42 holds each roll of film so that its principal boundary or long edge is oriented in the same manner with respect to the support. Indicating means are provided so that the film support can be rotated about the optical axis to a position wherein the roll orienting means or the long edge of the roll occupies the same angular position as the plane of polarization. Thus the long edge is a datum line for use in orienting the image recorded on the roll with respect to the plane of polarization. The indicating means for the support takes the form of graduations 50 and the vernier 51. The vernier is mounted on the frame 45 and has graduations 51a for cooperation with the graduations 50. When the zero graduations are aligned (as shown), the long edge of the film roll is oriented in a vertical direction. Thus, the long edge of the film roll and the plane of polarization (FIG. 4) are vertically oriented and parallel one another. The angular relationship is maintained when the plane of polarization is changed by rotating the roll film holder by a corresponding angular amount.

With the arrangement described above, the operator, sitting at the central viewing station, can photograph an entire series of say, 9 isoclinics on one inexpensive roll of film. By matching the angular graduations 50 on the revolving camera back with the graduations 23 on the analyzer ring, the long edge of each film frame is maintained in alignment with the plane of polarization as the same is changed.

After the roll of film is developed, the operator simply aligns a T square with the long dimension of the film strip and marks all of the isoclinics on the roll of film with vectors parallel to the long side. This is in contrast to the cumbersome prior art method wherein the polarization angle must be carefully measured and laid out for each frame, involving a separate operation for each isoclinic.

When a series of isoclinics are to be made into a composite drawing, the operator traces the vectors on each image on an overlay. In tracing, each image is oriented in the same manner with respect to the tracing paper. When the vectors are connected a stress direction map is formed.

While I prefer the aforementioned method of using a camera to document isoclinics, it will be apparent to one skilled in the art that the image can be projected on to a revolving translucent surface. The images are traced on paper as they are projected. The tracing paper is maintained in alignment with the plane of polarization in the same manner as the film roll.

In summary, the invention affords a simple and efficient way of documenting isoclinics and constructing a map of stress trajectories within a test specimen. It eliminates two primary sources of error by enabling the operator to keep track of the plane of polarization and simplifying map construction technique.

I claim:
1. In a method of constructing a map of the stress trajectories formed in an optically sensitive specimen which is birefringent under stress, said method comprising:
   placing the specimen on an optical axis;
   developing a stress image of said test specimen;
   projecting the image to an image recording media;
   indicating the relative angular relationship about said optical axis between the plane of polarization and a datum line on said image recording media;
   placing the plane of polarization in different angular positions about said optical axis while maintaining said angular relationship between said plane of polarization and said datum line;
   for each said position or the plane of polarization, making a record of the stress image; and
   on each said stress image record drawing a plurality of spaced apart vectors on the stress patterns, the vectors being drawn at a predetermined angle with respect to said datum line of the recording media.

2. In a method of constructing a map of the stress trajectories formed in an optically sensitive specimen which is birefringent under stress, said method comprising:
   placing the specimen on an optical axis;
   developing a stress image of said test specimen;
   projecting the image to an image recording media;
   indicating the relative angular relationship about said optical axis between the plane of polarization and a datum line on said image recording media;
   placing the plane of polarization in different angular positions about said optical axis while maintaining said angular relationship between said plane of polarization and said datum line;
   for each said position of the plane of polarization, making a record of the stress image;
   on each said stress image record drawing a plurality of spaced apart vectors on the stress patterns, the vectors being drawn at a predetermined angle with respect to said datum line of the recording media; and
   orienting each stress image record in the same manner and while so oriented, tracing the vectors on an overlay and then connecting the vectors on the overlay.

3. The method of constructing a map of the stress trajectories formed in an optically sensitive specimen which is birefringent under stress, said method comprising:
   placing the specimen on an optical axis in alignment with rotatably mounted polarizer and analyzer discs, a light source, a camera and means for loading the specimen;
   progressively changing the plane of polarization by incrementally rotating said polarizer and analyzer discs;
   successively rotating the film holder for the camera an amount such that each film frame has one of its principal boundaries parallel to the plane of polarization;
   photographing the isoclinics formed in the specimen upon each change of the plane of polarization, and corresponding rotation of the film holder;
   marking on the isoclinic patterns appearing in the developed film, a plurality of equally spaced apart vectors parallel to at least one of the boundaries of the film;
   successively orienting each of the photographs with respect to an overlay so that the specimen images are aligned; and
   tracing and connecting the vectors on the overlay.

4. In a photoelastic machine including a source of light, means for projecting a beam of light from said source along an optical axis, a polarizing assembly having polarizer and analyzer discs, means for mounting and loading a test specimen which is birefringent under stress, each of said elements being oriented along the optical axis so as to project isoclinic lines formed when a loaded test specimen is placed along said optical axis, to an image receiving station, and having image recording means for recording an image at said image receiving station, said image recording means including a supporting surface for maintaining a rectangular recording media in image receiving position, the combination comprising:
  means for rotating said polarizing assembly about the optical axis to change the plane of polarization;
  indexing means for said polarizing assembly including a first scale having uniformly spaced graduations and a first index mark adjacent said scale, said scale and said index being movable relative to each other upon rotation of said polarizing assembly to thereby indicate the plane of polarization;
  means for aligning a principal boundary of the rectangular image recording media with the plane of polarization, comprising means rotatably mounting said supporting surface, second indexing means including a second scale having uniformly spaced graduations corresponding to the graduations on said polarizing assembly scale, and a second index mark adjacent said scale, said scale and said index being movable relative to each other upon rotation of said supporting surface.

5. Apparatus according to claim 3 wherein said recording means is a camera, and said rotatably mounted supporting surface includes means for maintaining a photographic film in image receiving position.

6. Apparatus according to claim 3, wherein said supporting surface includes means for mounting a roll of photosensitive film.

7. Apparatus according to claim 3, wherein said first scale is a circular scale mounted on said polarizer assembly and movable relatively to said index mark upon rotation of said polarizer assembly, and said second scale is a circular scale mounted on said rotatable support means and movable relatively to said index mark upon rotation of said support means.

References Cited by the Examiner
UNITED STATES PATENTS 2,730,077  1/1956  Chapman _____ 88—14
3,177,761  4/1965  Redaer _____ 88—14

LOUIS J. CAPOZI, *Primary Examiner.*